United States Patent [19]

Kiguchi

[11] 4,105,422

[45] Aug. 8, 1978

[54] FILTRATION DEVICE

[75] Inventor: Terumasa Kiguchi, Tokyo, Japan

[73] Assignee: Kikuchi Kogyo Kabushiki Kaisha, Tokyo, Japan

[21] Appl. No.: 763,837

[22] Filed: Jan. 31, 1977

[30] Foreign Application Priority Data

Feb. 2, 1976 [JP] Japan .................................. 51-10615
May 24, 1976 [JP] Japan .................................. 51-59752
Sep. 16, 1976 [JP] Japan .......................... 51-123405[U]

[51] Int. Cl.² ............................................ B01D 45/00
[52] U.S. Cl. ...................................... 55/446; 55/484; 55/DIG. 36; 126/299 D
[58] Field of Search ................. 55/446, 440, 465, 482, 55/484, DIG. 36; 126/299 D

[56] References Cited

U.S. PATENT DOCUMENTS

| | | | |
|---|---|---|---|
| 1,527,235 | 2/1925 | Taylor | 55/446 |
| 2,424,219 | 7/1947 | Black | 55/446 |
| 2,827,126 | 3/1958 | Mazur | 55/446 |
| 3,566,585 | 3/1971 | Voloshen et al. | 55/DIG. 36 |

*Primary Examiner*—Bernard Nozick
*Attorney, Agent, or Firm*—Bernard Malina

[57] ABSTRACT

A filtration device which comprises a frame having a plurality of nozzles that are opposed but shifted aside relative to one another. The boxlike frame is composed of a first frame having a U-shaped cross-section and a second frame having an inversely U-shaped cross-section, both the first and second frames being provided with joining projections. A plurality of intake tubes in conical shapes are arranged on the inside of the first frame in a manner like a checkered pattern and the cross-section of each intake tube is enlarged in the suction direction and reduced in the exhaust direction. A plurality of outlet tubes projected downward and having fins at their lower ends are attached to the inside of the second frame. These outlet tube group is also arranged like a checkered pattern and shifted aside relative to the other nozzle group on the first frame.

12 Claims, 23 Drawing Figures

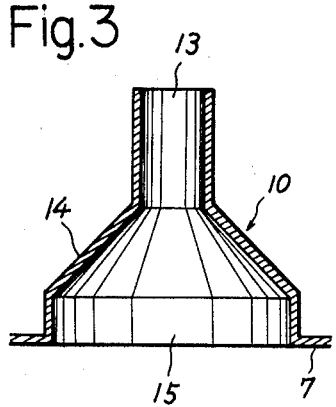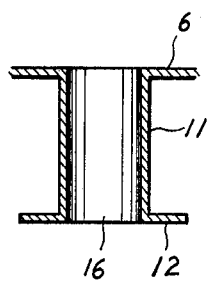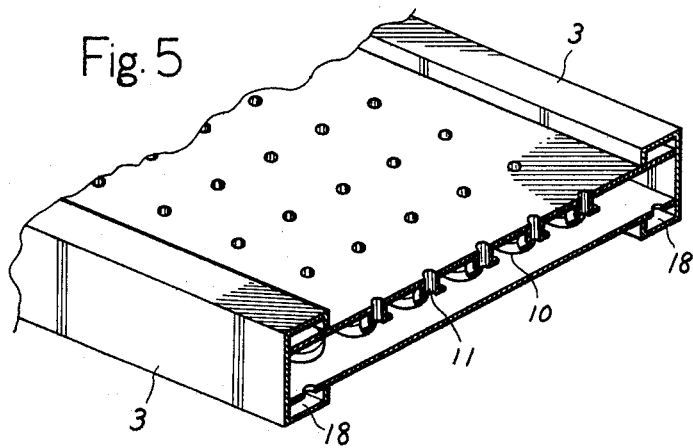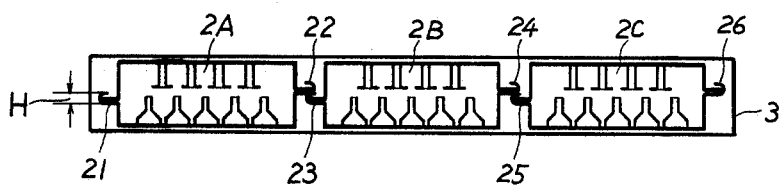

FILTRATION DEVICE

BACKGROUND OF THE INVENTION

This invention relates to a filtration device which is used for removing the oil particles and other foreign matters contained in air. More particularly, the invention relates to a filtration device which is effective when it is used in the hood of kitchen ranges.

What is required of the filtration device in a range hood is to separate and remove the oil particles, soot and other foreign matters from air by sticking them on a filter surface. It is also necessary to prevent the oil and dirt captured in a filtration device from taking fire and to improve the sanitary condition in the kitchen by facilitating the cleaning and washing of filtration device. In order to meet these requirements, the airtightness of air filters must be made complete and the efficiency of separation of oil contents must be improved. In addition to the above, captured oil has to be discharged easily without detaining it in the filter and the cleaning of filter has to be easily carried out.

In connection with hitherto proposed filtration devices, the above problems have never been satisfactorily solved yet. Especially, none of the problems on the prevention of catching fire and facilitation of cleaning has been settled.

OBJECTS OF THE INVENTION

It is, therefore, the first object of the present invention is to provide a filtration device which is effective in view of hydrodynamics for separating the oil particles and other foreign matters by the collision of air jet streams.

The second object of the invention is to provide a filtration device for range hoods which has airtight structure in itself, and when a plurality of the devices are used by joining them in a range hood, oil-containing air is not leaked through the joint gaps between adjacent filtration devices.

The third object of the invention is to provide a filtration device which can be easily cleaned up by removing dirty oil struck inside thereof.

Another object of the invention is to provide a filtration device which is able to introduce oil-containing air flow into the device evenly without causing the deviation of air flow.

BRIEF DESCRIPTION OF DRAWINGS

These and other objects and features of the present invention will become apparent in the following detailed description taken in connection with the accompanying drawings, in which:

FIG. 3 is an enlarged cross-sectional view of a nozzle to be attached in the filtration device;

FIG. 4 is also an enlarged cross-sectional view of an outlet tube;

FIG. 5 is a partial perspective view of the filtration device which is fitted to supporting frame;

FIG. 6 is a schematic cross-sectional view of filtration devices which are connected in side-by-side relation;

DETAILED DESCRIPTION OF PREFERRED EMBODIMENTS

Referring now to the accompanying drawings, several embodiments of the present invention will be described in detail in the following.

Figure 1:
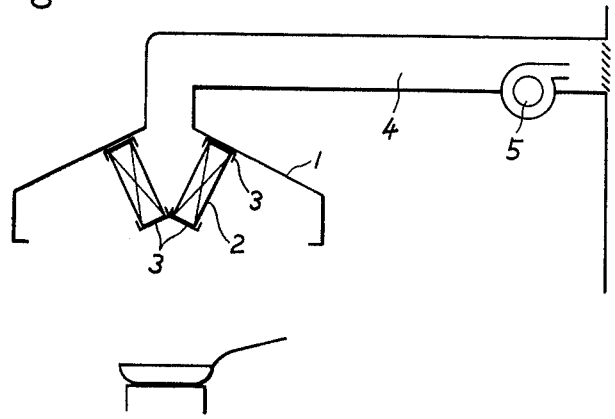
FIG. 1 is a vertical cross-sectional view of a filtration system which is provided with the filtration devices of the present invention.

FIG. 1 is a vertical cross-sectional view of a kitchen range hood which is provided with the filtration devices of the present invention. In the drawing, the range hood is denoted by a reference numeral 1 and near the intake port of the range hood 1 are attached filtration devices 2 by means of supporting frames 3 having U-shaped sections. When a pan is put on a kitchen range and food is cooked, oil particles together with water vapor are given off from the pan and they rises. The air carrying the oil particles and water vapor is then drawn by the fan 5 installed in a duct 4 through the filtration devices 2, in which devices the oil particles and other foreign particulate materials are removed and the remainder is exhausted to the air.

Figure 2:
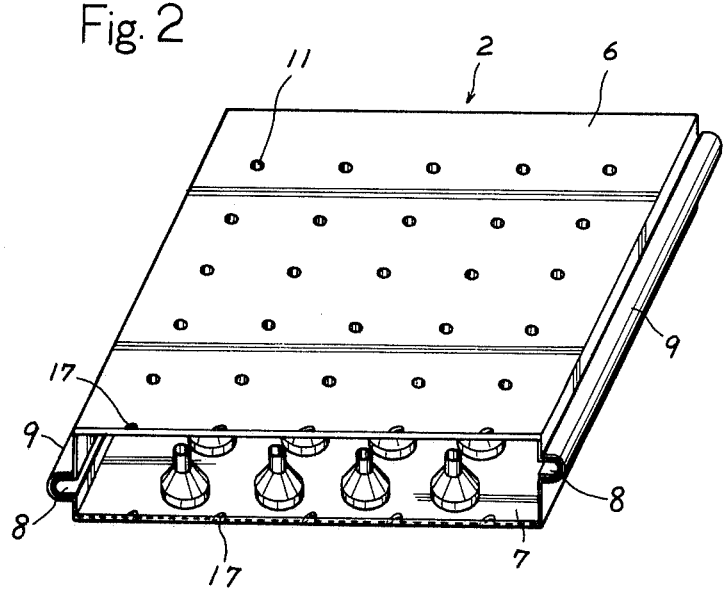
FIG. 2 is a perspective view of the filtration device.

The present invention relates to a filtration device that is used, for example, as the above. FIG. 2 is a perspective view of the first embodiment of the filtration device of the invention.

The filtration device 2 comprises an upper frame 6 and a lower frame 7 both forming a rectangular and hollow boxlike housing and the assembled housing can be divided into two in the directions of the thickness. So as to form the housing easily and separably with the upper frame 6 and lower frame 7, the upper frame 6 having a U-shaped section and the lower frame 7 having an inversely U-shaped section are provided on their edges with respective fitting ridges 8 and 9, each having a semicircular section. More particularly, the fitting ridges 8 are formed on the upper frame 6, while the fitting ridges 9 are formed on the lower frame 7. In order to fit the fitting ridge 8 into the other fitting ridge 9, the inner diameter of the semicircular section of the fitting ridge 9 is made equal to the outer diameter of the semicircular section of the fitting ridge 8. Further, since the upper frame 6 and the lower frame 7 are made of, for instance, stainless steel sheet, the above-mentioned outer diameter of the fitting ridge 8 may be made slightly larger than the inner diameter of the fitting ridge 9 in view of the resiliency of the material, thereby facilitating close and tight fitting of both the frames 6 and 7 of the filtration device 2.

The upper frame 6 and the lower frame 7 of the above-disclosed filtration device are provided with the following means so as to attain their own functions satisfactorily.

The lower frame 7 comprises a perforated plate or a multiaperture plate having a plurality of intake holes 15 on its surface. Each intake hole 15 is composed of a conical nozzle 10, the diameter of which is gradually increased in the suction direction, that is, the diameter is gradually reduced in the exhaust direction. The nozzle 10 performs a function as a suction tube. Further, the nozzle 10 perpendicularly extends from the inner wall of the lower frame 7 toward the inner wall of the upper frame 6, and the distance between the tip end of the nozzle 10 and the wall of the upper frame 6 is preferably about 6 to 10 mm. The oil-containing air flow that is drawn by the fan 5 is passed from the intake hole 15 to the nozzle hole 13 through the nozzle body 10, in which the velocity of the flow is increased and accordingly the inertia of oil particles in the air flow is also increased.

The under surface of the upper frame 6 (inside of filtration device 2) is provided with a plurality of outlet tubes 11, each of which has a fin 12 at the lowermost end thereof and the fin 12 is almost parallel to the upper frame 6. The outlet tubes 11 exhaust the air containing oil particles that is introduced into the filtration device 2, into the duct 4 in the next stage.

Figure 7:
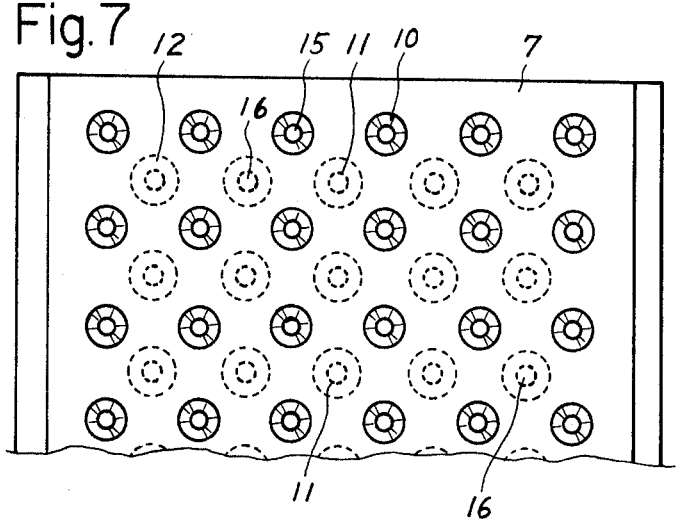
FIG. 7 is a plan view of the filtration device showing the positional relation between nozzles and outlet tubes.
Figure 8:
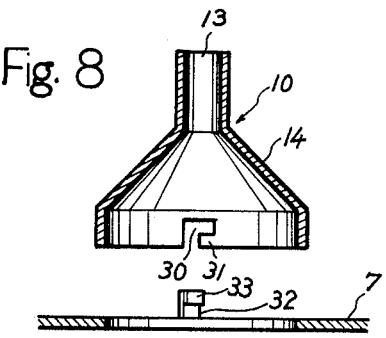
FIG. 8 is an enlarged vertical cross-sectional view showing the attaching of a nozzle.

The arrangements of the above nozzles 10 and the outlet tubes 11 are as follows. That is, a plurality of the nozzles 10 are distributed allover the lower frame 7 like a checkered pattern and a plurality of the outlet tubes 11 are also arranged likewise on the under surface of the upper frame 6. When the upper frame 6 and the lower frame 7 are combined, however, the nozzles 10 and the outlet tubes 11 are not opposed to each other but the formers are a little shifted aside relative to the positions of the latters. This arrangement is clearly shown in FIG. 7. That is, one of outlet tubes 11 (intake holes 16) is positioned at the intersection of diagonal lines of a square formed by four nozzles 10 (nozzle holes 13), so that the air from the nozzle holes 13 is not directly drawn into the intake holes 16.

In the following, the treatment of air flow containing fine oil particles with using the above-disclosed filtration device will be explained in detail.

When the fan 5 is started to set out the suction, the air containing oil particles is drawn into the intake holes 15. Since the cross-sectional areas of the nozzles 10 are tapered with conical configuration, the introduced air is gradually accelerated into jet streams and they are sent out form the nozzle holes 13 of the nozzles 10.

Further, the directions of air streams are largely varied toward the intake holes 16 of outlet tubes 11 by the suction force of the fan 5. However, the specific gravity of oil particles in the air streams is larger than that of the air itself and yet they have been accelerated, so that the oil particles travel straight upward and collide with the inner wall of the upper frame 6 to be captured by the wall surface. In this stage, as the air flow is in the condition of jet stream, it also collides with the outer peripheral walls of skirt portions 14 of nozzles 10, the inner wall of the lower frame 7 and the fins 12 of outlet tubes 11, the oil particles and other foreign matters such as water vapor particles that are carried by the air flow, are caught also by such collision surfaces. Theoretically, when the above-disclosed filtration devices are used in series, more completely filtered air can be exhausted to the duct 4.

The oil stuck on the inner walls of the filtration device 2 moves on the inner walls of the upper frame 6 and the lower frame 7 and drips into the supporting frame 3 having a U-shaped cross-section. In order to facilitate the flowing of oil into the supporting frames 3, the upper and lower frames 6 and 7 held by the supporting frames 3 are provided with a plurality of notches 17 in peripheral edges, thereby promoting the function of the spaces 18 of supporting frames 3 as dirt oil receivers. Though not being shown in the drawings, a pipe is attached to the space 18 and the collected oil is recovered from the filtration device 2 through the pipe.

The usage of the filtration device of the present invention will be further described.

In order to remove the oil content in the air, one filtration device of the above may be sufficient for ordinary domestic kitchen, however, many cooking ranges are used in cookeries for business purpose, so that many filtration devices must be used together in such case. When many filtration devices are used, the airtightness between them becomes a problem. Therefore, in this embodiment, the fitting ridges are employed for airtightly joining the filtration devices. As shown in FIG. 6, in each filtration device 2A, 2B or 2C, the fitting ridges of the opposed upper frame 6 and lower frame 7 are put together to form a boxlike housing. The combined fitting ridges are indicated by reference numerals 21 ro 26. The ridges of the respective filtration devices 2A, 2B and 2C that are indicated by odd-numbered reference numerals, are positioned on the same level and the even-numbered ridges 22, 24 and 26 are positioned on another upper level so as to be fitted to the former ridges 21, 23 and 25, in vertical relationship. Accordingly, when the filtration devices are joined together by bringing the ridges into contact to each other, the ridge 22 rides on the ridge 23 and the ridge 24, on another ridge 25. To the contrary with the drawing, the ridges 23 and 25 can be made to ride on the ridges 22 and 24, respectively.

In this joining, all the upper frames 6 of joined filtration devices must form a continuous plane and also the lower frames 7 must form another continuous plane. Therefore, all the rideges are positioned properly so as to realize the above condition. For this purpose, the fitting ridges 22, 24 and 26 projected from higher positions (hereinafter referred to as "upper ridges") are formed on upper positions which are higher than the positions of the fitting ridges 21, 23 and 25 projected from lower positions (hereinafter referred to as "lower ridges") by the cross-sectional width H of the lower ridges. When the upper ridges 22 and 24 are fitted on the lower ridges 23 and 25 having such positional relation, the upper and lower frames 6 and 7 of filtration devices form continuous planes, thus the filtration devices 2A, 2B and 2C can be joined straight. Furthermore, the positioning of filtration devices are performed by fitting them to the cross-sectionally U-shaped supporting frames 3, accordingly, when the upper ridges 22, 24 and 26 are formed at the position a little lower than the above-described position, each pair of ridges can be fitted to each other more closely with their resiliency. Thus, the air drawn by the fan 5 can be prevented from the leakage through the junctures of filtration devices.

In the following, another embodiment of the present invention will be described.

It is desirable that the shape of nozzles 10, especially the cross-sectional area of intake holes 15 is changed in accordance with the suction force of the fan 5, the number of cooking pans used on ranges and other factors. For instance, when a high-powered fan 5 is used, the nozzles having larger intake holes 15 can be employed. So as to meet the above case, the nozzles 10 are made detachable relative to the lower frame 7. That is, formed on the lower frame 7 are fixing projections 32 at the positions to be attached with the nozzles 10 and perpendicularly to the lower edges of skirt portions 14 of nozzles 10. Each fixing projections 32 is provided with an engaging pawl 33 and a pair of fixing projections 32 are necessary for each nozzle 10. The peripheral rim of the skirt portion 14 of the nozzle 10 is provided with engaging lugs 31 that are formed by making cuts 30 in a crank shape. By the way, respectively two or more crank-shaped cuts 30 and engaging lugs 31 are necessary for each nozzle 10. In the fixing of a nozzle 10, the engaging lug 31 is firstly fitted to the engaging pawl 33 of the fixing projection 32 and the nozzle 10 is then turned in the direction of the inner end of the cut 30. Accordingly, if several kinds of nozzles 10 are reserved, the nozzles 10 that are most suitable for the used fan 5 and ranges can be selected.

Figure 9:
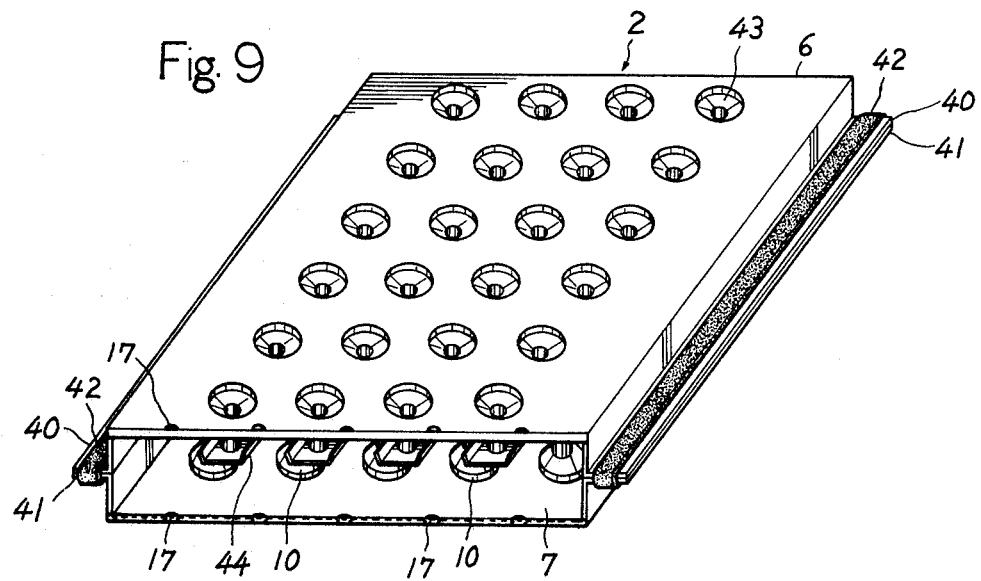
FIG. 9 is a perspective view of another embodiment of the filtration device of the present invention.

In the following, another embodiment proposed for facilitating the discharging of captured oil content will be described. FIG. 9 is a perspective view of the filtration device of this embodiment. This filtration device also comprises an upper frame 6 and a lower frame 7 that are combined into a boxlike housing and are divided into the respective members in the direction of the thickness. In this embodiment, however, the joined portions of the upper and lower frames 6 and 7 are provided with hems 40 and 41 which are put together by bands 42 so as to attain airtight fitting.

A plurality rows of conical nozzles 10 extending upward are arranged allover the inner wall of the lower frame 7 at regular intervals in a checkered pattern. Between the nozzles 10 are projected another series of nozzles 43 which extend from the upper frame 6. Thus the nozzles 10 and 43 are alternately arranged like the teeth of a comb. Like the above, the nozzles 43 are also arranged at regular intervals in a checkered pattern and the tip ends of the nozzles 43 are provided with trays 44. Both the edges of 3 to 4 mm width of the tray 44 are folded up so as to receive recovered oil and to pass it to the oil receiver. A plurality of nozzle holes 45 of nozzles 43 are directed toward each of the arrayed trays 44 and the nozzle holes are distributed like the holes of a perforated plated. The shape of nozzle 43 is symmetrical with that of the nozzle 10 and the form of the space between adjacent nozzles 43 is similar to that between adjacent nozzles 10. Such space constitutes an air chamber 46. The intake holes 15 are made in the wall portion of the lower frame 7 and nozzles 10 are attached on the insides of the intake holes 15. Each nozzle hole 13 of a nozzle 10 opens into each air chamber 46, into which the air containing oil particles is blown. Further, the nozzle 43 is extended into an air chamber 46' formed between adjacent nozzles 10. The numeral 47 indicates an outlet hole of a nozzle 43, which hole 47 is formed in the wall portion of the upper frame 6. Accordingly, the upper frame 6 also forms a perforated plate which has outlet holes 47 in the same number as the nozzles 43.

Figure 13:
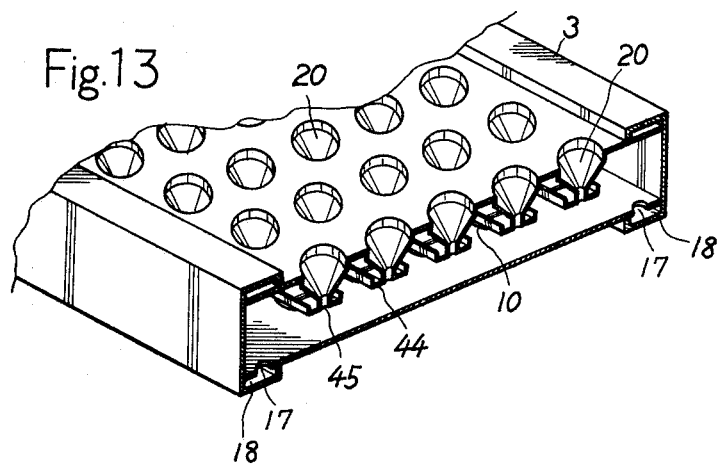
FIG. 13 is a partial perspective view of the filtration device which is fitted to supporting frames.
Figure 14:
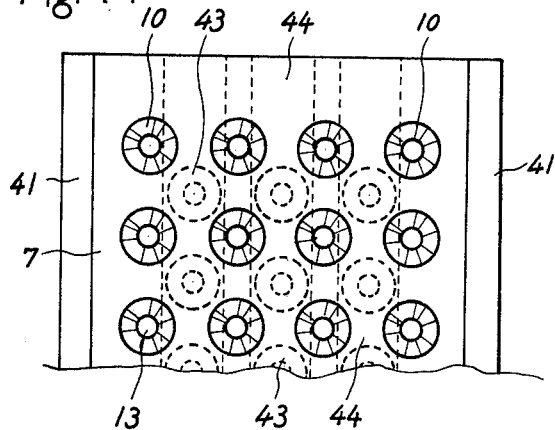
FIG. 14 is a plan view of the filtration device showing the positional relation of nozzles of an upper frame and a lower frame in which the upper frame is taken off.

The positional relation among the nozzles 10, 43 and their holes will be described according to FIG. 13. To the intersection of diagonal lines of a square formed with four adjacent nozzles 10, a nozzle 43 that is concentric with a nozzle hole 45 and an outlet hole 47 is projected downward from the upper frame 6. Accordingly, the air flow blown out from the nozzle hole 13 collides with the inner wall of the upper frame 6 and changing the direction, it flows into the duct 4 through the nozzle 43.

The function of this embodiment will now be described in the following.

Figure 10:
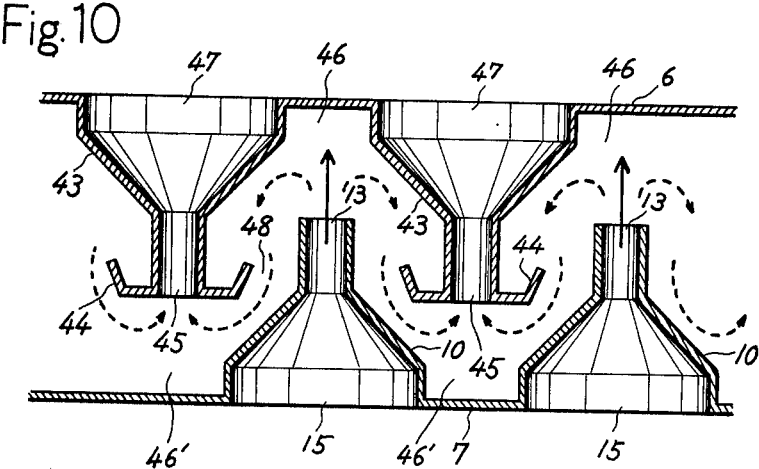
FIG. 10 is an enlarged partical cross-sectional view showing the interior structure of the filtration device.
Figure 11:
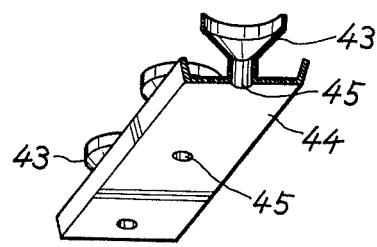
FIG. 11 is a perspective view of a tray showing the structure thereof.

When suction of air is started by moving a fan 5, the air containing oil particles is drawn into the intake holes 15. The taken air is gradually accelerated in nozzles 10 and blown out from the nozzle holes 13 of nozzles 10. The directions of jets of air containing oil particles ae largely changed into outflow directions by the suction force of the fan 5. The changed directions of air flows are indicated by arrows of dash lines in FIG. 10. Since the specific gravities of oil particles, oily dust and water vapor contained in the air flow are large, the directions of them are not caused to vary by the suction force. Accordingly, as shown in the drawing with solid line arrows, the oil particles and other foreign matters flow straight and collide with the inner wall of the upper frame 6, thereby they being captured by the upper frame 6.

Since the nozzles 10 and the nozzles 43 are symmetrical with each other, the air chambers 46 among nozzles 43 are of almost the same configuration as that of the air chambers 46' among the other nozzles 10. The trays 44 project on both sides of the air flow outlet of the chamber 46, so that the cross-sectional areas become small forming channels 48. With these channels 48, the air flows are much accelerated, in addition, the changes of directions into the nozzle holes 45 of nozzles 43 become large. As disclosed above, the inertia of oil particles and oily dust having larger specific gravities is larger than that of the air itself so that the oil particles and oily dust can not follow air flow lines and moves straight or turns aside. Thus the oil content remaining in the air flow is caught by the trays 44.

As disclosed above, the oil content captured by the wall surface of the upper frame and the side walls of nozzles 43 gradually flows down. Since the filtration devices are installed with sufficient inclination as shown in FIG. 1, the oil recovered into the trays 44 flows in the direction of the inclination and it is collected into the supporting frames 3 as dirt oil receivers, then it is recovered through pipe lines (not shown). Further, the reference numeral 17 indicates notches which lead the oil captured by the inner walls into the supporting frames.

Figure 12:
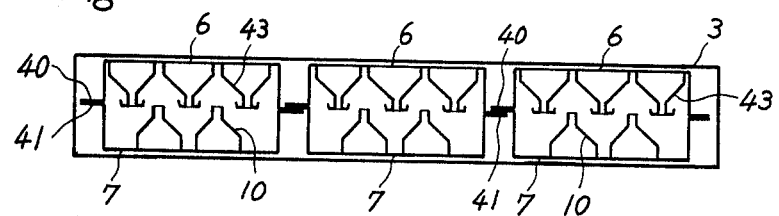
FIG. 12 is a schematic illustration in side elevation of connected filtration devices.

In the kitchen for business purpose, many cooking ranges are used so that many filtration devices are installed and they must be airtightly adjoined together in use. In order to join the upper frame 6 with the lower frame 7, both side edges of them are provided with hems 40 and 41 as shown in FIG. 9. The pair of hems 40 and 41 on the left side are positioned lower than the other pair of hems 40 and 41 on the right side by the thickness of them. On the other hand, the hems 40 and 41 on the right side can be positioned lower than those on the left side by their thickness. The filtration device having pairs of hems shifted from each other is inserted into supporting frames. When a plurality of such filtration devices are fitted into the supporting frames, a pair of hems of one filtration device ride on a pair of hems of an adjacent filtration device, thus the hems are closely fitted to each other and the airtightness of the filtration devices can be attained. Further, the filtration devices can be connected straight so that the upper and lower surfaces thereof form continuous planes. FIG. 12 is a side elevation showing the state of joining of three filtration devices and may be helpful in apprehending the foregoing description.

In the following, the above-disclosed filtration devices which are not joined straight but arranged in a V-shape on a frame body will be disclosed. This is proposed in order to facilitate the treatment of the dirt oil that is separated and recovered by filtration devices.

Figure 15:
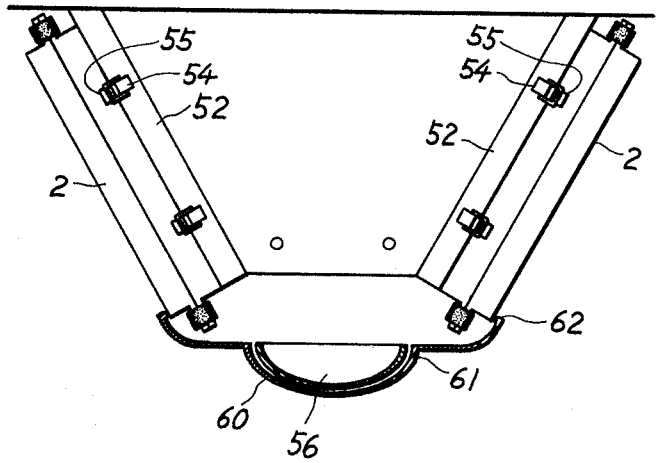
FIG. 15 is a partially cross-sectional side view of a still other embodiment of the present invention.

FIG. 15 is a partially cut away front elevation of a range hood which is provided with filtration devices.

Figure 16:
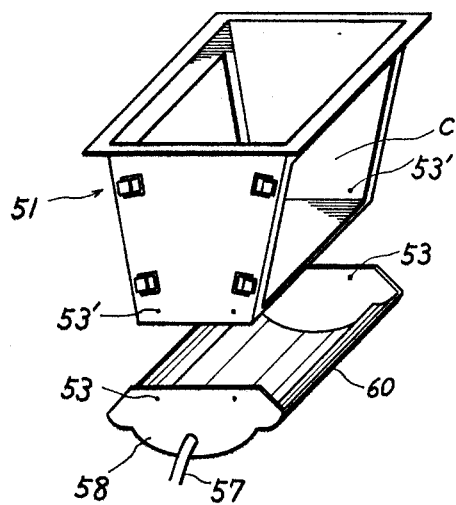
FIG. 16 is a perspective view showing the state that an oil receiver is taken off from a range hood.

In the drawing, a hood is denoted by a reference numeral 51 and a frame body, by a reference numeral 52. As shown in FIG. 16, the hood has a V-shaped cross-section and a pair of opposed walls are made open walls C. Filtration devices 2 are attached to the walls C so as to close up the openings thereof. The filtration devices 2 are attached to the open walls C of the hood in detachable manner by buckles 54 fixed on the frame body 52 and fastening pieces 55 to be caught by the buckles 54.

A dirt oil receiver 60 closes the open bottom of the hood 51 and receives the drops of recovered oil from the filtration devices 2. The oil receiver 60 is like a tray having side walls 61 of arcuate in cross-sections on both sides. The side walls 61 gradually rise up and enter into flanges 62 which extend outward. The free edges of the flanges 62 are rounded and the filtration devices 2 are airtightly held between the flanges 62 and the frame body 52.

The oil receiver 60 is fitted to the bottom of the hood 51 to close up the bottom and it is fixed by inserting set screws through the screw holes 53 on both sides of the oil receiver 60 and other screw holes 53' made in the side walls of the hood 51. The member indicated by the reference numeral 57 is a drain pipe which leads the oil received in the oil receiver 60 to the outside of the filtration devices. In order to drain the collected oil effectively, the pipe 57 is preferably attached to a bottom portion of the long tray-like oil receiver 60.

It may be necessary to carry out periodical cleaning of the oil receiver 60 receiving recovered oil so as to prevent the occurrence of fire and the emitting of offensive odor by removeing adhered oil in the oil receiver 60.

Figure 19:
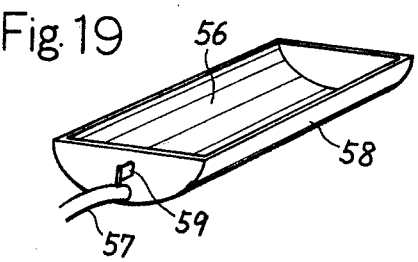
FIG. 19 is a perspective view of an inner tray.

However, it is difficult and troublesome for kitchen workers to periodically disengage the oil receiver that is fixed with set screws and to wash with detergent. Therefore, the oil receiver 60 is provided with a detachable inner tray 56 like a drawer. That is, a tray receiving portion is formed by making a cut in the wall 58 of the oil receiver 60 and the inner tray 56 is closely inserted into the tray receiving portion. As shown in FIG. 19, the bottom of the inner tray 56 is gradually raised by tapering the body toward the inner end so that the recovered oil flows by its own gravity toward the drain pipe inlet. Further, so as to receive the captured oil completely into the inner tray 56, it is necessary that the length of the inner tray 56 is made equal to the length of the oil receiver 60. In order to prevent the oil from trickling to the under side of the inner tray 56, the walls 58 of the inner tray 56 must be brought into close contact with the inside wall surfaces of the oil receiver 60. Therefore, the accuracy of machinework and finishing is required for making the inner tray 56 and the tray receiving portion. Incidentally, the reference numeral 59 indicates a cock that opens and closes the passage in the drain pipe 57.

Figure 17:
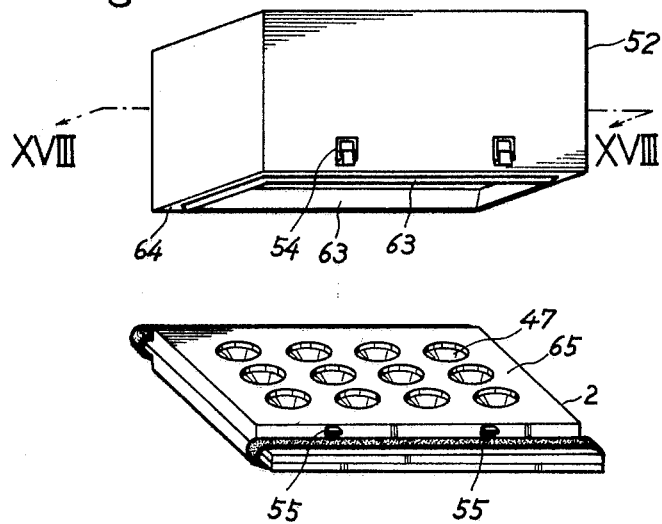
FIG. 17 is a perspective view for explaining the frame of a hood and a filtration device.
Figure 18:
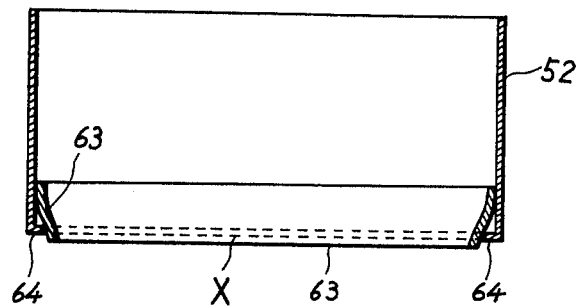
FIG. 18 is a vertical cross-sectional view taken on the line XVIII—XVIII in FIG. 17.

The structure of the frame body of range hood is shown in FIG. 17. To the inside walls of the frame body 52 are attached elastic thin sheets 63 by spot welding. The thin sheets 63 may be made of, for example, 0.2 mm thick stainless steel sheet. The thin sheets 63 extend outward to the opening and beyond the flanges 64 of the frame body 52. The extended portions of the thin sheets 63 from flanges 64 are about 10 to 15 mm in width measured from the dash line X and the edges of the thin sheet 63 are bent inward from the positons of 2 to 5 mm outside from edges of flanges 64 so as to become parallel to the dash line X. The hood 52 is provided with the above thin sheets 63 on its inner four side edges. The attachment of the thin sheets 63 can be carried out by spot welding and the corner portions between two adjoining thin sheets are joined by butt welding. The size of the filtration device 2 is made the same as that of the frame body 52. A plurality of outlet holes 47 are arranged inside the margins 65 of about 15 mm in width on the periphery of the filtration device 2. When the frame body 52 and the filtration device 2 are put together, the thin sheets 63 come into contact with the peripheral margins 65 of the filtration device 2, and when the buckles 54 are fixed to the fastening pieces 55, the exposed portions of thin sheets 63 outside the dash line X are forced to bent inward. With this compressive stress by the bending, the sheets 63 are brought into close contact with the filtration device 2. Therefore, the airtightness between the frame body 52 and the filtration device 2 can be successfully attained.

Figure 20:
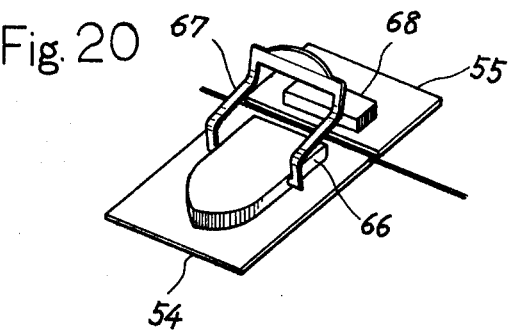
FIG. 20 is a perspective view of fastening members.

Further, the fixing members of buckles 54 and fastening pieces 55 as shown in FIG. 20, can be used for attaching the filtration device 2 to the frame body 52. The fixing member consists of a buckle 54 having a catch 67 which becomes stable in right side and left side positions by the force of a leaf spring 66, and a fastening piece 55 having a projection 68 to engage with the catch 67.

Figure 21:
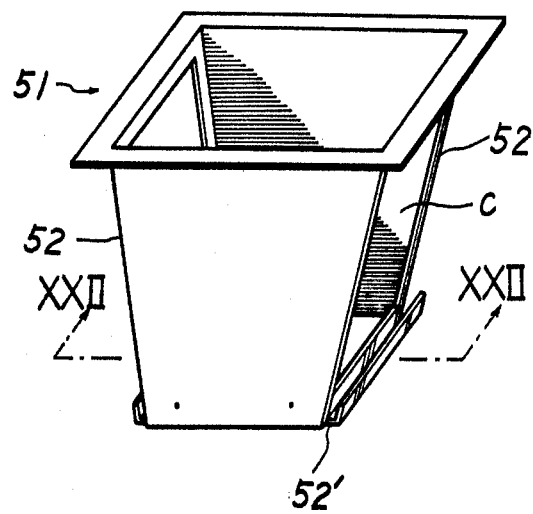
FIG. 21 is a perspective view of another embodiment of supporting frame having a bottom frame.
Figure 22:
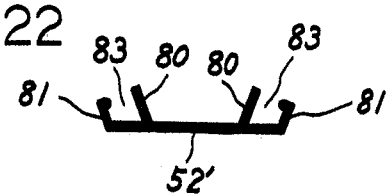
FIG. 22 is a vertical cross-sectional view of the bottom frame taken on the line XXII—XXII in FIG. 21.
Figure 23:
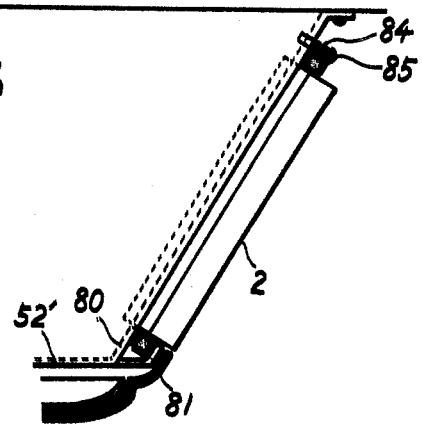
FIG. 23 is a partial cross sectional view of the supporting frame which is provided with a filtration device.

Another embodiment of the present invention will be described in the following. This embodiment is shown in FIGS. 21 to 23 and the purpose of the provision of this embodiment is to facilitate the attaching of filtration devices 2.

In the drawings, the reference numeral 51 indicates a hood and the reference numeral 52, a frame body. On opposed sides of the hood 51, open walls C are formed. A bottom frame 52' that is perpendicular to the open walls C is provided with a pair of inside plates 80 which extend from the portions near both ends of the bottom frame 52' and are opposed to each other. Further, the bottom frame 52' is provided with a pair of outside plates 81 on the outsides of the inside plates 80. Thus, the channels 83 for closely receiving the fitting ridges 8 and 9 or hems 40 and 41 of filtration devices 2 are formed between each pair of the inside plate 80 and the outside plate 81. In other words, a filter supporting portion to receive most of the weight of filtration device is formed between the plates 80 and 81. The filtration device 2 is fitted to the filter supporting portion as shown in FIG. 23. That is, the filtration device 2 is fitted by bringing one side wall of the filtration device 2 into contact with the open wall C and the fitting ridges 8 and 9 or hems 40 and 41 are inserted into the channel 83. Further, the connecting portion on the filtration device 2 is firmly fixed by the heads 85 of bolts 84. Furthermore, when the filtration device 2 shown in FIG. 9 is used in this embodiment, the trays 44 are turned by 90° to be at right angle to the hems 40 and 41, thereby causing the captured oil to flow down. Other structures are similar to those shown in FIG. 15 and FIG. 16 so that the description on them are now omitted.

The filtration device of the present invention for a range hood is formed and operated as disclosed above, therefore several advantages can be expected as compared with ordinary ones.

Since the suction surface of the filtration device is formed with a perforated plate, the air containing oil particles is introduced evenly without causing any deviation. Further, the drawn air flow containing oil particles is accelerated by nozzles and the direction of the air flow is changed many times, so that the oil contents are captured by wall surfaces in every direction change, and thus, the oil contents in the air flow can be satisfactorily removed.

In the case that a plurality of filtration devices are joined together, the airtightness can be attained by the close contact of the fitting ridges of the filtration devices. Further, in the latter embodiment, the thin sheets function as sealing springs, so that the fan can be used at its maximum rate and short circuit of oil-containing air passing the portions other than the filtration device can be prevented. Therefore, the filtering effect can be improved and the duct and fan can be prevented from being stained. When the filtration devices are joined together, it is not necessary to use asbestos as a filler, therefore the external appearance is not impaired by dirty asbestos.

Furthermore, since the filtration device can be easily detached from the frame body, and it can be divided into two parts, the cleaning of the filtration device can be easily performed after a certain period of use. Therefore, the prevention of offensive odor with decomposition of dirt oil can be expected and the prevention of fire is also expected. Especially, with regard to the latter, the filtration device is provided with the nozzles, the diameters of which are gradually reduced in the direction of inside, and the air passages are largely curved, so that, even when fire enters into the filtration device through the upper frame and the recovered oil takes fire, the flame very hardly comes out through the nozzles of the lower frame or outlet tubes. Accordingly, there is almost no danger of fire.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A filtration device comprising: a filtration box formed of an upper frame and a separate lower frame; said upper frame including an upper plate having a pair of upper facing sidewalls including a pair of upper flanges extending outwardly from the lower edges of said upper sidewalls respectively; said lower frame including a lower plate having a pair of lower facing sidewalls including a pair of lower flanges extending outwardly from the upper edges of said lower facing sidewall respectively; a support frame releasably securing said separate upper and lower frame together to render said pair of upper flanges in facing abutment with said pair of lower flanges and adjacent opposing upper and lower sidewalls respectively coplanar and to form said filtration box releasably mounted in said support frame; said upper and lower plates each having an array of apertures therein said arrays being offset one from the other; said lower plate having a plurality of frusto-conical intake tubes each having a wide opening mounted over and communicating with the respective aperture in said lower plate; and said upper plate having a plurality of outlet tubes each having one open end thereof mounted over and communicating with the respective aperture in said upper plate; said intake tubes extending interiorly of said filtration box toward said upper plate and said outlet tubes extending downwardly toward said lower plate into the respective spaces between adjacent intake tubes; whereby release of said filtration box from said support frame and separation of said upper and lower frames from each other provides complete access to all the surfaces of said upper and lower frames to permit cleaning thereof.

2. A filtration device as claimed in claim 1 wherein said supporting frame comprises a pair of opposing U-shaped sections for slidably receiving abutting pairs of said upper and lower sidewalls.

3. A filtration device as claimed in claim 1 wherein said supporting frame comprises a pair of opposing channels each of which slidably receives a pair of said abutting flanges.

4. A filtration device as claimed in claim 1 wherein each of said outlet tubes is of frusto-conical configuration having a wide opening extending over the respective aperture in said upper plate and a narrow opening facing said lower plate.

5. A filtration device as claimed in claim 1 wherein the spaces between said intake and outlet tubes define air flow passages within said filtration device and wherein each of said outlet tubes includes a fin extending outwardly from the other open end thereof for narrowing said air flow passages.

6. A filtration device as claimed in claim 1 wherein each of said fins includes a peripheral flange extending therefrom to form an annular tray.

7. A filtration system comprising a plurality of filtration boxes arrayed in side-by-side relationship in a support frame, each of said filtration boxes comprising an upper frame and a separate lower frame; said upper frame including an upper plate having a pair of upper facing sidewalls including a pair of upper flanges extending outwardly from the lower edges of said upper sidewalls respectively; said lower frame including a lower plate having a pair of lower facing sidewalls including a pair of lower flanges extending outwardly from the upper edges of said lower facing sidewalls respectively; said flanges on each side of said filtration box interfitting to form said filtration box with a first pair of interfitting flanges on one side of said box and a second pair of interfitting flanges on the other side thereof; said first and second pairs of interfitting flanges being on different levels and being so positioned that when said filtration boxes are arrayed in side-by-side relationship in said support frame the first pair of interfitting flanges of one box rests upon the second pair of interfitting flanges of the adjacent box and said support frame firmly locks said first pair of interfitting flanges on said second pair of interfitting flanges to maintain the outer surfaces of said plates coplanar; said locked first and second pairs of interfitting flanges thereby forming a barrier across the gap between two adjacent boxes to prevent the passage of air therethrough; said upper and lower plates each having an array of apertures therein said arrays being offset one from the other; and lower plate having a plurality of frusto-conical intake tubes each having a wide opening mounted over and communicating with the respective aperture in said lower plate; and said upper plate having a plurality of outlet tubes each having one open end thereof mounted over and communicating with the respective aperture in said upper plate; said intake tubes extending interiorly of said filtration box toward said upper plate and said outlet tubes extending downwardly toward said lower plate into the respective spaces between adjacent intake tubes; whereby release of said filtration boxes from said support frame and separation of said upper and lower frames from each other provides complete access to all the surfaces of said upper and lower frames to permit cleaning thereof.

8. A filtration system as claimed in claim 7 wherein said supporting frame comprises a pair of opposing U-shaped sections for slidably receiving said filtration boxes.

9. A filtration system as claimed in claim 7 wherein said supporting frames comprises a pair of opposing channels each of which slidably receives a pair of said interfitting flanges.

10. A filtration system as claimed in claim 7 wherein each of said outlet tubes is of frusto-conical configuration having a wide opening extending over the respective aperture in said upper plate and a narrow opening facing said lower plate.

11. A filtration device as claimed in claim 7 wherein the spaces between said intake and outlet tubes define air flow passages within said filtration device and wherein each of said outlet tubes includes a fin extending outwardly from the other open and thereof for narrowing said air flow passages.

12. A filtration device as claimed in claim 11 wherein each of said fins includes a peripheral flange extending therefrom to form an annular tray.

* * * * *